United States Patent [19]

Sugden

[11] Patent Number: 5,033,265
[45] Date of Patent: Jul. 23, 1991

[54] COAXIAL HYDRAULIC ACTUATOR SYSTEM

[75] Inventor: Kenneth B. Sugden, Rockford, Ill.

[73] Assignee: Sundstrand Corporation, Rockford, Ill.

[21] Appl. No.: 321,291

[22] Filed: Mar. 8, 1989

[51] Int. Cl.⁵ ............................................. F16D 31/02
[52] U.S. Cl. ........................................ 60/444; 60/476; 60/488
[58] Field of Search ................. 60/443, 444, 473, 476, 60/488; 92/121, 125

[56] References Cited

U.S. PATENT DOCUMENTS

| | | | |
|---|---|---|---|
| 683,427 | 10/1901 | Barger | 92/125 |
| 1,965,338 | 7/1934 | Ott . | |
| 1,988,213 | 1/1935 | Ott . | |
| 2,035,465 | 3/1936 | Erskine et al. . | |
| 2,049,092 | 7/1936 | Sturm . | |
| 2,237,018 | 4/1934 | Tweedale | 60/488 |
| 2,348,425 | 5/1944 | Tucker . | |
| 2,549,714 | 4/1951 | Shannon . | |
| 2,750,895 | 6/1956 | Sturm . | |
| 2,782,724 | 2/1957 | Humphreys . | |
| 2,936,589 | 5/1960 | Quintilian | 60/488 |
| 3,066,654 | 12/1962 | Matt | 92/125 |
| 3,246,574 | 4/1966 | Eickmann . | |
| 3,361,076 | 1/1968 | Davis . | |
| 3,521,449 | 7/1970 | Speggiorin | 60/488 |
| 3,918,855 | 11/1975 | Bornholdt . | |
| 4,325,215 | 4/1982 | Yamamoto | 417/220 |
| 4,340,338 | 7/1982 | Lemke . | |
| 4,414,854 | 11/1983 | Haeg | 92/121 |
| 4,637,782 | 1/1987 | Tuebler et al. | 417/310 |
| 4,753,071 | 7/1988 | Sugden . | |
| 4,759,186 | 6/1988 | Sugden . | |

Primary Examiner—Edward K. Look
Assistant Examiner—F. Daniel Lopez
Attorney, Agent, or Firm—Wood, Phillips, Mason, Recktenwald & Vansanten

[57] ABSTRACT

A coaxial hydraulic actuator system utilizes a vane pump close coupled to a vane actuator. The vane pump includes a rotatable housing which is perpendicularly movable by a control piston to direct fluid flow through first and second fluid conduits in a pintle port transfer shaft. The transfer shaft conduits are in communication with first and second variable volume compartments in the vane actuator. Thus, controlled movement of the vane pump housing results in corresponding resulting angular movement between the actuator vane and the actuator housing. This relative angular positioning can be used to control the relative positioning between first and second loads, such as the rotors of a dual permanent magnet generator.

8 Claims, 3 Drawing Sheets

COAXIAL HYDRAULIC ACTUATOR SYSTEM

FIELD OF THE INVENTION

This invention relates generally to an actuator system and more particularly to a hydraulic actuator coaxially mounted with a vane pump.

BACKGROUND OF THE INVENTION

Hydraulic actuators have been proposed generally to provide relative positioning of a load relative to a fixed reference. Such an actuator of the rotary vane type is disclosed in my U.S. Pat. No. 4,759,186. Also, such an actuator of the piston type is disclosed in my U.S. Pat. No. 4,753,071.

Conventional actuator systems require complicated and extensive peripheral equipment to produce sufficient power to control positioning. In applications where hydraulic power is utilized, the oil flow rate is relatively high, therefore requiring large valves, pumps and accumulator elements. In an application such as an aircraft where size and weight are critical, such constructions may be unacceptable. Moreover, the parasitic power required by such power actuator systems can reduce the overall system efficiency.

The present invention is intended to overcome these and other problems associated with actuator systems.

SUMMARY OF THE INVENTION

It is an object of this invention to provide a hydraulic actuator which is close coupled with a flow reversible vane pump, resulting in savings in size, weight, and cost while improving overall efficiency of the actuator system.

A typical embodiment of the invention achieves the foregoing object with an actuator system including a shaft having first and second fluid conduits therethrough and defining an axis. A flow reversible vane pump includes a housing movable perpendicular to the axis, a rotor rotationally mounted relative to the shaft, and a plurality of vanes each slidably mounted to the rotor defining pump chambers between adjacent ones of the vanes. A plurality of ports are provided, one for each chamber, each port being in selective fluid communication with one of the shaft conduits. An actuator includes a housing having a chamber, the housing being rotationally mounted relative to the shaft in axial spaced relation with the pump. A divider is mounted in the chamber for movement therein and divides the chamber into first and second variable volume compartments. An actuator element is coupled to the divider to be moved thereby and includes means for coupling the divider to a load. First and second ports are provided respectively fluidically coupling the first and second variable volume compartments with the first and second shaft conduits. Control means engage the vane pump housing for moving the housing relative to the shaft to operate the vane pump to controllably develop fluid pressure in one of the fluid conduits to control movement of the actuator element.

The resulting construction eliminates the need for various hydraulic components which might otherwise be required such as a separate pump, numerous valves, accumulators and the associated piping. Thus, the system is lighter in weight and smaller in size, as well as less expensive.

In one embodiment of the invention, the divider is a vane mounted in the chamber for rotation therein about the axis.

In another embodiment of the invention, a second actuator element is coupled to the housing to be moved thereby and includes means for coupling the housing to a second load. In a dual permanent magnet generator having loads in the form of a pair of rotors, one rotor is coupled to the vane with the other rotor being coupled to the housing for relative angular positioning between the pair of rotors.

In yet another embodiment of the invention, a control piston controls perpendicular movement of the pump housing relative to the shaft. Bearing means are provided for supporting the pump housing to permit free rotation thereof relative to the rotor.

In still another embodiment of the invention, a servo valve controls the positioning of the control piston. Operation of the servo valve causes the pump housing to be moved resulting in flow of hydraulic fluid to one of the actuator variable volume compartments to control positioning of the actuator elements.

In yet a further embodiment of the invention, a vane pump includes a side wall axially movable relative to the rotor and means for biasing the side wall into engagement with said rotor. The side wall biasing means acts as a pressure relief valve to relieve any overpressure which collects in the vane pump.

Other objects and advantages of the invention will become apparent from the following specification taken in connection with the accompanying drawings.

DESCRIPTION OF THE INVENTION

Figure 1:
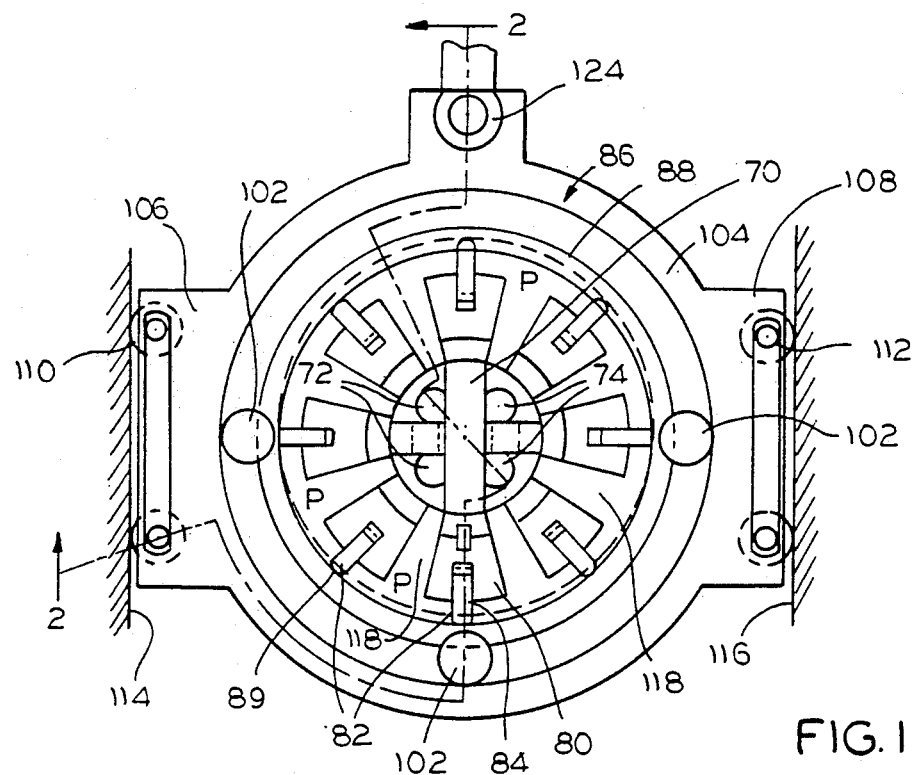
FIG. 1 is a sectional view of a vane pump for a dual permanent magnet generator (PMG) incorporating the coaxial hydraulic actuator system of the present invention.
Figure 2:
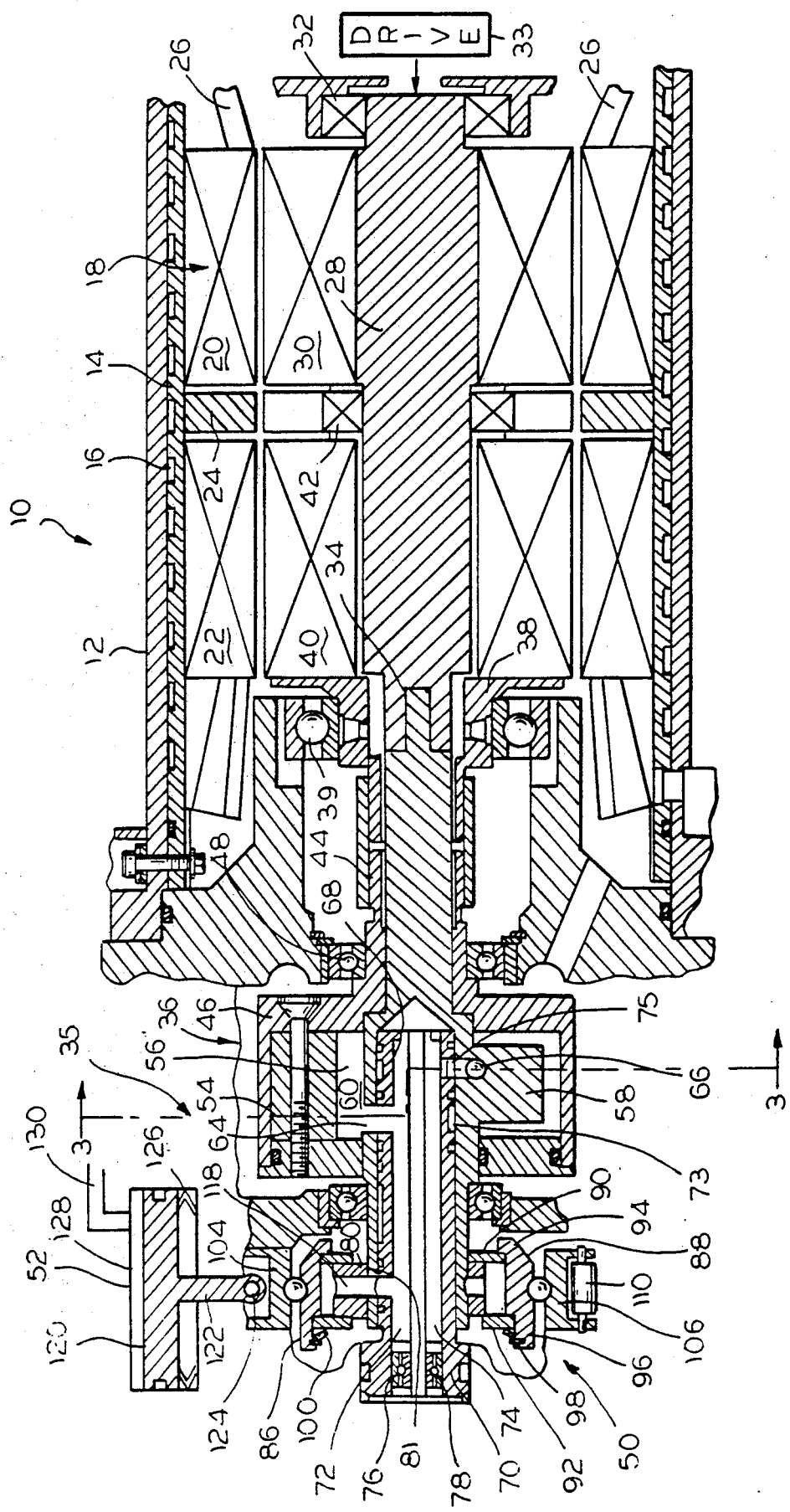
FIG. 2 is a sectional view taken along the line 2—2 of FIG. 1.

An exemplary embodiment of an actuator system according to the invention is illustrated in the drawings and with reference to FIGS. 1 and 2 is shown in conjunction with a dual permanent magnet generator (PMG) 10. The PMG 10 includes an elongated, generally tubular housing 12. An inner jacket 14 includes a spiral groove 16 within the housing 12 serving to close the groove 16 so as to provide a conduit for so-called back-iron cooling.

Radially inwardly of the jacket 14 is a stator 18. The stator 18 is comprised of first and second armatures 20 and 22. The armatures 20 and 22 are coaxial and slightly spaced apart by a support element 24. A common set of windings, the end turns 26 of which can be seen, extend through both of the armatures 20 and 22.

An elongated inner shaft 28 extends longitudinally through the housing 10 along the elongated axis thereof and rotationally supports and is affixed to a first permanent magnet rotor assembly 30. One end of the inner shaft 28 is journaled in bearings 32 and may be coupled to a drive 33 such as an aircraft engine. Its other end is splined to an actuator output shaft 34. The actuator output shaft 34 forms a part of a coaxial actuator system 35 having a rotary actuator 36 which is discussed in greater detail below.

An outer shaft 38, journalled in a bearing 39, is concentric with the inner shaft 28 and is positioned near the actuator shaft 34. The outer shaft 38 rotationally supports and is affixed to a second permanent magnet rotor assembly 40. A bearing 42 provides for generally frictionless relative angular movement between the rotor assemblies 30 and 40 about the axis of the shafts 28 and 38 and additionally provides a journal therefor.

The outer shaft 38 is splined to a second actuator output shaft 44 which is part of an actuator housing 46. The second actuator output shaft 44 is journaled in bearings 48 for rotation about the axis of the shafts 28 and 38.

The actuator system 35 includes the actuator 36, a close coupled vane pump 50 and a control piston 52.

The actuator housing 46 includes an internal partition 54 defining a chamber 56 therein for receiving a hydraulic fluid. The chamber 56 has the shape of a section of a cylinder. The actuator shaft 34 carries a vane 58 within the chamber 56 which is also rotatable about the axis of the shaft 28 and is sealed against both the partition 54 and the walls defining the chamber 56. The vane 58 and the partition 54 divide the chamber 56 into first and second compartments 60 and 62 of variable volume. The volume of each compartment 60 and 62 is determined by the relative angular position of the vane 58 within the housing 46 with respect to the partition 54. The vane 58 includes first and second ports 64 and 66, one for each compartment 60 and 62, respectively. The ports 64 and 66 are axially spaced with respect to one another and open into opposite sides of the vane 58. The ports 64 and 66 are in communication with a central axial bore 68 provided in the vane 58.

Figure 3:
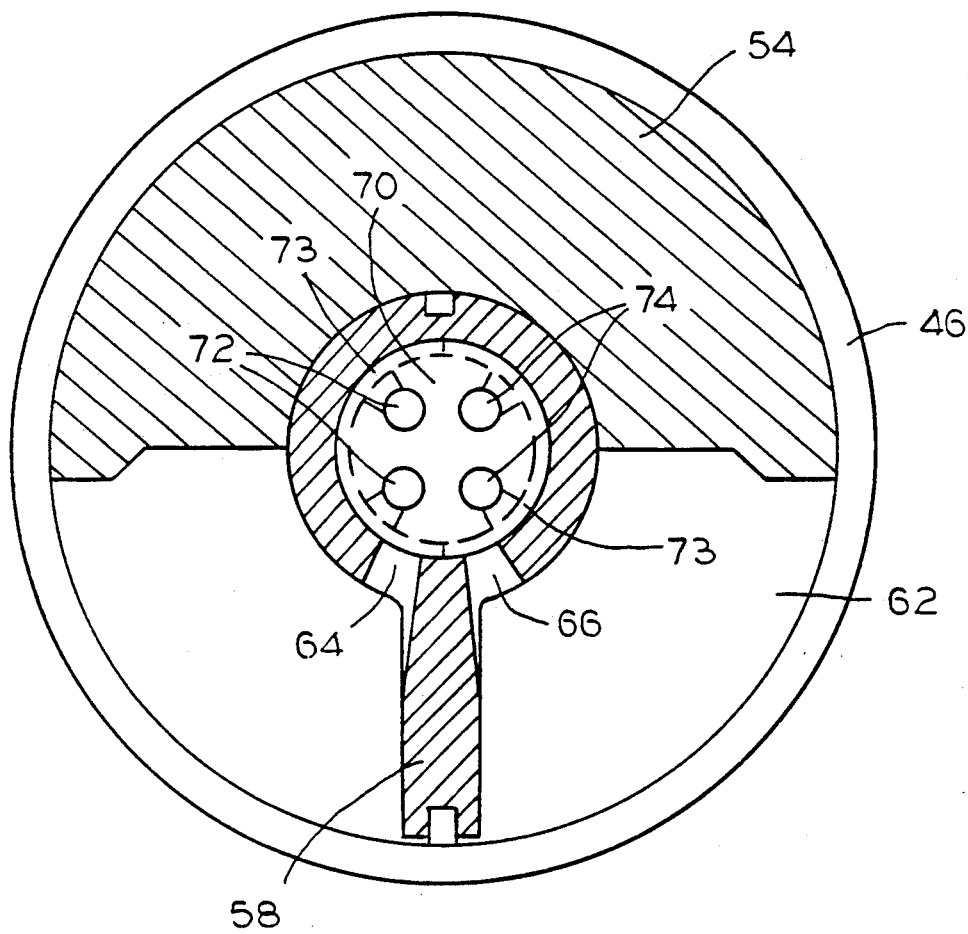
FIG. 3 is a sectional view taken along the line 3—3 of FIG. 2.

A stationary pintle port transfer tube center shaft 70 extends through the vane actuator central bore 68. The transfer tube 70 includes first and second fluid conduits 72 and 74, respectively. Referring also to FIG. 3, a first annulus 73 in the outer circumference of the shaft 70 is in communication with the first conduit 72. A second annulus 75, also in the outer circumference of the shaft 70, and axially spaced from the first annulus 73, is in communication with the second conduit 74. Check valves 76 and 78 are provided at the distal end of each respective conduit 72 and 74, remote from the vane actuator 36.

The transfer tube first conduit 72 is in hydraulic communication through the first annulus 73 with the vane actuator first port 64 to permit passage of hydraulic fluid to and from the first variable volume compartment 60. Similarly, the transfer tube second conduit 74 is in hydraulic communication through the second annulus 75 with the vane actuator second port 66 to permit hydraulic fluid flow to and from the second variable volume compartment 62.

The vane pump 50, illustrated in both FIGS. 1 and 2, includes a rotor 80 slidable, coaxial and rotational with the actuator vane 58. The rotor 80 is generally cylindrically shaped and includes a central bore 81 and a plurality of equally circumferentially spaced slots 82. Slidably mounted in each slot 82 is a blade or vane 84. Surrounding the rotor 80 is a housing 86 comprising an outer sleeve 88, an inner side wall 90 and an outer side wall 92. The sleeve 88 inner diameter is larger than the outer diameter of the rotor 80 and smaller than the combined outer diameter of the rotor 80 and length of the vanes 84, as is well known. A plurality of variable volume pumping chambers "P" are defined by the pump housing 86, the rotor 80 and each pair of adjacent vanes 84. The sleeve 88 includes a radially inwardly extending shoulder 94 for supporting the inner wall 90 in slidable engagement with the rotor 80. The sleeve 88 also includes a collar 96 opposite the shoulder 94. The collar 96 includes an inwardly facing groove supporting a washer 98. Disposed between the washer 98 and the outer wall 92 is a Belleville washer 100. The Belleville washer 100 biases the outer wall 92 into slidable engagement with the rotor 80. Also, under an overpressure condition, the Belleville washer 100 acts as a pressure relief valve. Specifically, under an overpressure condition, hydraulic fluid forces the Belleville washer 100 outwardly so as to relieve pressure in the vane pump 50.

A plurality of bearings 102 rotationally support the housing 86 within a support guide 104. The support guide 104 is of generally cylindrical shape and includes first and second opposite side walls 106 and 108 each having respective roller supports 110 and 112. The roller supports 110 and 112 engage opposite respective side walls 114 and 116 of the actuator system housing. Accordingly, the support guide 104, and thus the housing 86, are movable upwardly or downwardly between the walls 114 and 116. As is well known with vane pumps, such upward and downward can be used to controllably place the housing 86 in an off-center position relative to the axis of the rotor 80 to create high pressure and low pressure pumping chambers to direct hydraulic fluid to control the permanent magnet generator 10, as is discussed more specifically below.

The rotor 80 includes a plurality of ports 118, one associated with each pumping chamber "P", in communication with the rotor bore 81. Each port 118 is used to direct hydraulic fluid between the pumping chamber "P" and one of the transfer tube conduits 72 or 74, depending upon the relative position of the rotor 80 with respect to the tube 70.

The vane pump 50 operates, as is well known, to provide reversible fluid flow. Specifically, referring to FIG. 1, and assuming the rotor 80 is rotating in a clockwise direction, if the guide support 104 is moved upwardly, to an off-center position, then the pumping chambers "P" on the left side of the vane pump 50 are under low pressure, while the pumping chambers "P" on the right side are under high pressure. Resultantly, hydraulic fluid is forced outwardly to the second conduit 74, and is drawn inwardly from the first conduit 72. Conversely, if the support guide 104 is moved downwardly to an off-center position, then reverse fluid flow is provided, i.e., fluid flows outwardly to the first conduit 72 and inwardly from the second conduit 74. The rate of fluid flow is determined by the amount which the housing 86 is off-centered relative to the rotor axis.

The control piston 52 includes a piston 120 and a piston rod 122. The piston rod 122 is secured to the pump roller guide 104 in a conventional manner as at 124. A spring 126 normally biases the piston 120 upwardly against fluid pressure in a pressure chamber 128. A conduit 130 is provided for supplying fluid to the pressure chamber 128.

Figure 4:
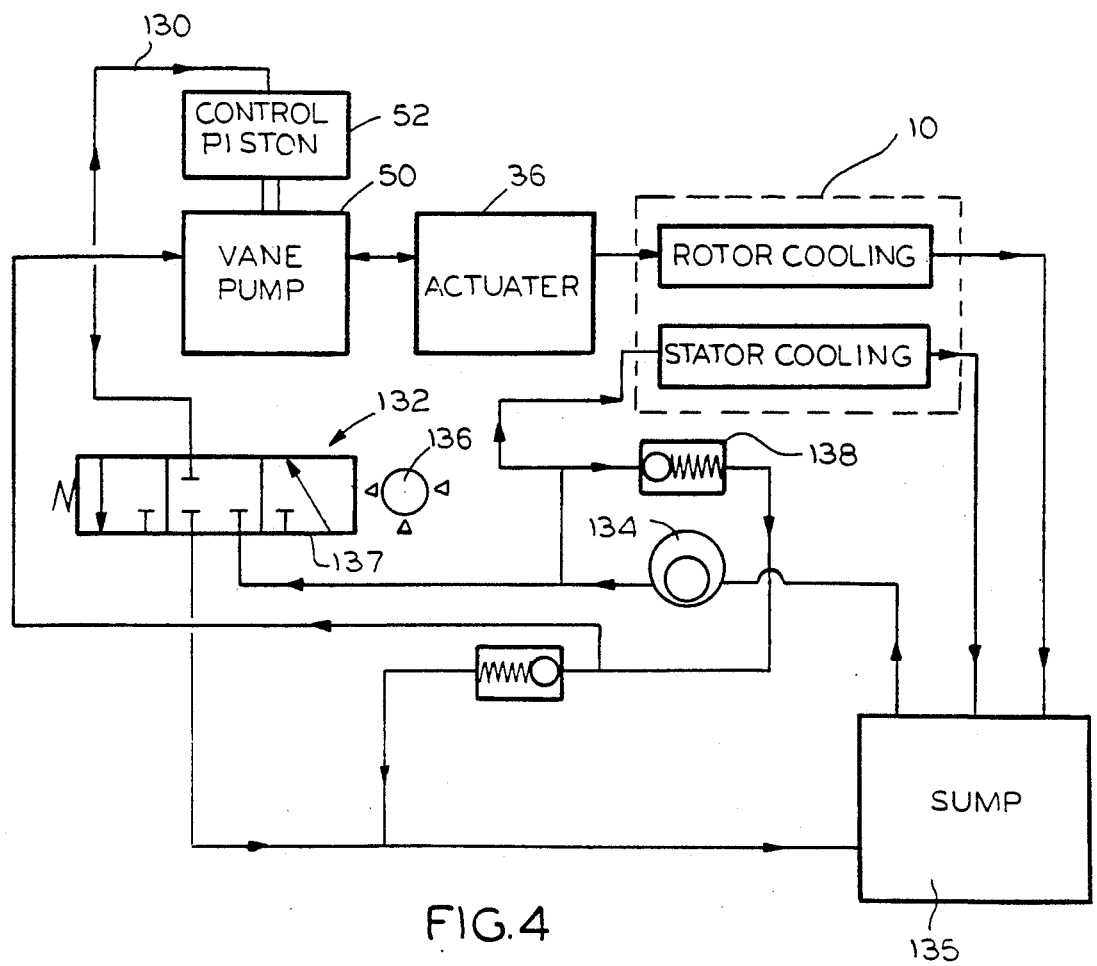
FIG. 4 illustrates in block diagram form a hydraulic system of the dual PMG of FIG. 1.

Referring to FIG. 4, a hydraulic schematic in block diagram form of an overall system including the actuator system of the present invention is illustrated.

The control piston 52 receives pressurized hydraulic fluid through the conduit 130 from a servo valve 132. The servo valve 132 receives pressurized hydraulic fluid pressure from a pump 134, and returns fluid to a sump 135. The servo valve 132 includes a servo operator 136 which operates a three-position valve 137. In a first position of the valve 137, there is no fluid flow to or from the control piston 52. In a second position of the valve 137, fluid flow is directed from the pump 134 to the control piston 52. In a third valve position, hydraulic fluid is returned from the control piston 52 to the sump 135.

The pump 134 also provides pressurized fluid which provides for cooling of the stator, i.e. the above described back-iron cooling. A supply of makeup fluid is provided by a low pressure source, such as a pressure relief valve 138 in communication with the pump 134. The relief valve 138 is in communication with the transfer tube check valves 76 and 78.

The servo valve 132 is operated in a controlled manner, which control is not part of this invention, to effectively control fluid flow from the pump 50 and thereby the relative angular position of the rotary vane 58 and the actuator housing 46. In particular, the valve 137 can be positioned as illustrated in FIG. 4 to halt flow of hydraulic fluid, the valve 137 might be shifted to the left from the position illustrated in FIG. 3 to connect the pump 132 to the control piston 52, or be shifted to the right from the position illustrated in FIG. 3 to connect the control piston 52 to the sump 135.

Assuming that the vane pump is operating in a condition with the housing 86 centered relative to the axis, then in the case of the first mentioned condition above, the position of the actuator vane 58 relative to its housing 46 remains constant as the vane pump 50 is in a neutral condition due to the relative incompressibility of hydraulic fluid in the two actuator compartments 60 and 62. In the case of the second condition, hydraulic fluid in the first conduit 72 is under pressure and therefore enters the actuator housing 46 through the first annulus 72 and the first port 64. Resultantly, the first variable volume compartment 60 increases in size, causing the second variable compartment 62 to decrease in size thus forcing hydraulic fluid out through the second port 66 to be returned to the vane pump 50 through the second annulus 75 to the second conduit 74.

In the case of the third mentioned condition, that is, where the control piston 52 is in coupled to the sump 135, the vane pump directs pressurized fluid through the second conduit 74, and thus through the second annulus 75 to the second actuator port 66 into the second variable volume compartment 62 to increase the size of same. Fluid returns to the pump 50 from the first variable volume compartment 60 through its associated port 64 and the first annulus 73 to the first conduit 72.

In either case, where the vane 58 moves relative to the housing 46, such movement continues until the vane 58 abuts the partition 54 or until the control piston 52 is positioned such that the vane pump housing 86 is again centered, whichever occurs first. Because these factors limit relative rotation between the actuator vane 58 and the actuator housing 46, it should be appreciated that operation of the drive 33, which is coupled to the vane 58 via the shaft 28 and the actuator shaft 34, always causes the housing 46 to rotate during general operation.

Although not illustrated, the servo valve 132 could be controlled responsive to a conventional voltage regulator to maintain voltage output from the dual permanent magnet generator.

While a servo valve 132 is shown in the Figures, a manually operated valve, a hydraulically actuated valve or some other known valve could be substituted for the servo valve as is known in the art.

While the embodiment disclosed herein is that of a dual permanent magnet generator, the applicant does not intend that the application of this invention be limited to usage in conjunction with a permanent generator. For example, this invention could be utilized in a transmission for gear shifting. Other systems where such an actuator could be employed are known in the art and will therefore not be discussed herein.

Furthermore, the present invention might be employed in an application where the respective loads are coaxial, as described hereinabove, are positioned in a side-by-side relationship or are positioned in some other relationship. Also, variations of the disclosed system, such as replacing the vane actuator with a hydraulic motor, could be used for other applications as where shaft-to-shaft speed variations are desired. In such instances, close coupling between such devices is provided through the transfer tube shaft 70.

Similarly, the principals utilized in this invention could also be applied with non-rotary type actuators, such as a piston operated actuator.

I claim:

1. An actuator system comprising:
   a shaft having first and second fluid conduits extending therethrough,
   means mounting said shaft relative to an axis;
   a flow reversible vane pump including a housing movable relative to said axis, a rotor rotationally mounted relative to said shaft and having a plurality of circumferentially spaced slots, a plurality of vanes each slidably mounted in one of said slots and defining pumping chambers between adjacent ones of said vanes, and a plurality of ports, one for each chamber, each port being in selective fluid communication with one of said shaft conduits;
   an actuator including a housing rotationally mounted relative to said shaft in axial spaced relation with said pump, a chamber within said housing, a divider mounted in said chamber for movement therein and dividing said chamber into first and second variable volume compartments, said divider being coupled to said rotor for rotation therewith, an actuator element coupled to said divider to be moved thereby and including means for coupling said divider to a load, and first and second ports respectively fluidically coupling said first and second variable volume compartments with said first and second shaft conduits; and
   control means engaging said vane pump housing for moving said housing relative to said axis to operate said vane pump to controllably develop fluidic pressure to control movement of said actuator element.

2. The actuator system of claim 1 wherein said vane pump housing includes pressure relief means for releasing excess pressure in said housing.

3. The actuator system of claim 1 wherein said control means is a control piston.

4. The actuator system of claim 1 wherein said vane pump includes means for permitting free rotation of said pump housing.

5. A hydraulic actuator system comprising:
   a transfer shaft having first and second fluid conduits extending therethrough and defining an axis;
   a flow reversible vane pump including a housing movable generally perpendicular to said axis, a rotor rotationally mounted relative to said shaft and having a plurality of circumferentially spaced slots, a plurality of vanes each slidably mounted in one of said slots and defining pumping chambers between adjacent ones of said vanes, and a plurality of ports, one for each chamber, each port being in selective hydraulic communication with one of said shaft conduits;

bearing means for supporting said pump housing to permit free rotation thereof;

an actuator including a housing rotationally mounted relative to said shaft in axial spaced relation with said pump, a chamber within said housing, a vane mounted in said chamber for rotation therein about said axis and dividing said chamber into first and second variable volume compartments, said vane being coupled to said rotor for rotation therewith, an actuator element coupled to said vane to be moved thereby and including means for coupling said vane to a load, and first and second ports respectively hydraulically coupling said first and second variable volume compartments with said first and second shaft conduits;

a control piston engaging said vane pump housing for moving said housing generally perpendicular to said axis; and means including at least one fluid flow control device operating said piston to operate said vane pump to controllably develop hydraulic pressure to control movement of said actuator element.

6. The hydraulic actuator system of claim 5 wherein said fluid flow control device comprises a servo operated control valve.

7. The hydraulic actuator system of claim 5 wherein said vane pump housing includes pressure relief means for releasing excess pressure in said housing.

8. A coaxial hydraulic actuator system comprising:

a pintle port transfer shaft having first and second hydraulic conduits extending therethrough;

means mounting said shaft and defining an axis;

a flow reversible vane pump including a housing movable generally perpendicular to said axis, a rotor coaxial and rotational relative to said shaft and having a plurality of circumferentially spaced slots, a plurality of vanes each slidably mounted in one of said slots and defining pumping chambers between adjacent ones of said vanes, and a plurality of ports, one for each chamber, each port being in selective hydraulic communication with one of said shaft conduits;

bearing means for supporting said pump housing to permit free rotation thereof;

a rotary actuator including a housing coaxial with and rotational relative to said shaft in axial spaced relation with said pump, a chamber within said housing, a vane mounted in said chamber for rotation therein about said axis and dividing said chamber into first and second variable volume compartments, said vane being rotationally coupled to said rotor for rotation therewith, a first actuator element coupled to said vane to be moved thereby and including means for coupling said vane to a first load, a second actuator element coupled to said housing to be moved thereby and including means for coupling said housing to a second load, and first and second ports respectively hydraulically coupling said first and second variable volume compartments with said first and second shaft conduits;

a control piston engaging said vane pump housing for moving said housing generally perpendicular to said axis; and means including at least one fluid flow control device operating said piston to operate said vane pump to controllably develop hydraulic pressure to control relative movement of said first and second actuator elements.

* * * * *